(12) United States Patent
Yamada (10) Patent No.: US 7,203,236 B2
(45) Date of Patent: Apr. 10, 2007

(54) MOVING PICTURE REPRODUCING DEVICE AND METHOD OF REPRODUCING A MOVING PICTURE

(75) Inventor: Toru Yamada, Tokyo (JP)

(73) Assignee: NEC Corporation (JP)

( * ) Notice: Subject to any disclaimer, the term of this patent is extended or adjusted under 35 U.S.C. 154(b) by 912 days.

(21) Appl. No.: 09/955,366

(22) Filed: Sep. 18, 2001

(65) Prior Publication Data

US 2002/0034254 A1 Mar. 21, 2002

(30) Foreign Application Priority Data

Sep. 19, 2000 (JP) .............................. 2000/282994

(51) Int. Cl.
*H04B 1/66* (2006.01)

(52) U.S. Cl. .......................... 375/240.12; 375/240.25; 375/240.26; 375/240.2; 382/233; 382/235; 382/250; 382/238

(58) Field of Classification Search ........... 375/204.12, 375/240.25, 240.26, 240.2; 348/397.1; 382/233, 235, 250, 238
See application file for complete search history.

(56) References Cited

U.S. PATENT DOCUMENTS

| | | | | |
|---|---|---|---|---|
| 5,300,949 A | * | 4/1994 | Rodriquez et al. ........... | 345/555 |
| 5,534,942 A | * | 7/1996 | Beyers et al. ................ | 348/569 |
| 5,832,120 A | * | 11/1998 | Prabhakar et al. ........... | 382/233 |
| 5,835,237 A | * | 11/1998 | Ebrahimi ..................... | 358/448 |
| 5,973,740 A | * | 10/1999 | Hrusecky ................ | 375/240.15 |
| 6,111,989 A | * | 8/2000 | Chang et al. ................ | 382/250 |
| 6,141,456 A | * | 10/2000 | Pearlstein et al. ........... | 382/250 |
| 6,148,033 A | * | 11/2000 | Pearlstein et al. ..... | 375/240.16 |
| 6,167,089 A | * | 12/2000 | Boyce et al. ........... | 375/240.15 |
| 6,249,547 B1 | * | 6/2001 | Boyce et al. ........... | 375/240.15 |
| 6,262,770 B1 | * | 7/2001 | Boyce et al. ............. | 348/402.1 |
| 6,370,192 B1 | * | 4/2002 | Pearlstein et al. ........... | 375/240 |

(Continued)

FOREIGN PATENT DOCUMENTS

JP 8-317384 11/1996

(Continued)

OTHER PUBLICATIONS

Japanese Office Action issued Apr. 6, 2004 (w/English translation of relevant portions).

(Continued)

*Primary Examiner*—Shawn S. An
(74) *Attorney, Agent, or Firm*—Dickstein, Shapiro, LLP.

(57) ABSTRACT

A moving picture reproducing device includes a compressed data buffer, a display size obtaining unit, a resolution selecting unit, four kinds of resolution decoding units, and a frame data buffer. Compressed moving picture is received by the compressed data buffer and decoded in one of the four kinds of resolution decoding units. The display size obtaining unit obtains a display size of the decoded moving picture when the image is displayed on a display device. The resolution selecting unit selects one resolution decoding unit from the four kinds of resolution decoding units, according to the display size obtained by the display size obtaining unit. When the moving picture is reduced and displayed on the display device, it is not required to decode the moving picture in an original resolution. The moving picture reproducing device decodes the compressed moving picture in a necessary and the minimum resolution.

6 Claims, 4 Drawing Sheets

U.S. PATENT DOCUMENTS 6,563,876 B2 * 5/2003 Boyce et al. .......... 375/240.15
6,668,018 B2 * 12/2003 Pearlstein et al. ..... 375/240.12

FOREIGN PATENT DOCUMENTS

| | | |
|---|---|---|
| JP | 9-055926 | 2/1997 |
| JP | 9-247673 | 9/1997 |
| JP | 11-243561 | 9/1999 |
| JP | 11243561 A * | 9/1999 |
| JP | 2000-217111 | 8/2000 |

OTHER PUBLICATIONS

Japanese Office Action issued Sep. 21, 2004 (w/English translation of relevant portions).

* cited by examiner

MOVING PICTURE REPRODUCING DEVICE AND METHOD OF REPRODUCING A MOVING PICTURE

BACKGROUND OF THE INVENTION

1. Field of the Invention

The invention relates to a method of decoding (reproducing) a moving picture (image signals) which is compressed in a determined compression method and a moving picture reproducing device which performs the method. In particular, the invention relates to a method of decoding compressed moving picture at various decoding precision levels (resolutions) and reproducing the decoded moving picture and a moving picture reproducing device which performs the method.

2. Description of the Related Art

A conventional video signal coding technology is prescribed in a standard, such as MPEG (Moving Picture Experts Group: which is well known as an International Standard of a moving picture compressing method). Such a coding technology is used to reduce an amount of information of moving picture, and the compressed moving picture is used in communication and data accumulation.

A user instructs a PC (personal computer) to reproduce the compressed moving picture by using a GUI (Graphical User Interface) implemented in an Operating System running on the PC. In this event, the user may change a display size of the moving picture by using a pointing device such as a mouse.

The change of the display size of the moving picture is done by a graphic hardware, and is not related to a decoding process of the compressed moving picture. For example, even if the display size is reduced to fifty percent in a vertical and a horizontal direction, the decoding process is performed about all signals of the compressed moving picture. However, it is to be considered that detailed information (high frequency component) included in the decoded moving picture is lost due to the reduction of the display size.

Also, there are various display devices to display the decoded moving picture. In general, a single display device can display the image in a plurality of resolutions. Therefore, when the image is displayed in a low resolution or in a small display size, a size of the image may be reduced so as to match with the display size.

However, in the prior art, decoding process is performed about all signals of compressed moving picture, regardless of the display size. Thus, there is a problem that decoding process of high frequency components, which are not displayed after all, is performed even when the display size is smaller than an original display size of the moving picture.

SUMMARY OF THE INVENTION

Therefore, it is an object of the invention to overcome the problem.

That is, it is an object of the invention to provide a method of reproducing moving picture and a device to perform the method. The method performs decoding process according to a resolution of a display size, to improve a performance of reproducing the image by simplifying the decoding process without degradation of image display quality and to generate reduced image independently of a performance of a graphic hardware.

According to a first aspect of the invention, there is provided a moving picture reproducing device which decodes compressed moving picture and provides the decoded image to a display device. The device comprises a plurality of decoding units each of which decodes the compressed moving picture in a resolution which is different from resolutions of the other decoding units, a display size obtaining unit which obtains a display size of image displayed on the display device, and a decoding unit selecting unit which selects a decoding unit to decode the compressed moving picture, from the plurality of decoding units according to the display size obtained by the display size obtaining unit.

According to a second aspect of the invention, in the moving picture reproducing device of the first aspect, the decoding unit selecting unit is constructed to newly select the decoding unit whenever the selected decoding unit decodes a predetermined amount of the compressed moving picture.

According to a third aspect of the invention, in the moving picture reproducing device of the first aspect, when the selected decoding unit decodes the compressed moving picture in a resolution which is lower than an original resolution of the compressed moving picture, the decoding unit is constructed to decode them by reducing an order of IDCT (Inverse Discrete Cosine Transformation) and performing motion compensation according to the reduced order of IDCT.

According to a fourth aspect of the invention, the moving picture reproducing device of the first aspect further comprises a display size storing device which stores the display size used when the previous decoding process is completed, wherein the decoding unit selecting unit selects, at the beginning of current decoding process, one of the decoding units according to the display size stored in the display size storing device.

According to a fifth aspect of the invention, in the moving picture reproducing device of the second aspect, the moving picture is compressed based on MPEG and the decoding unit selecting unit is constructed to select the decoding unit for each GOP (Group of Picture).

According to a sixth aspect of the invention, in the moving picture reproducing device of the fifth aspect, the decoding unit selecting unit is constructed to select, at the beginning of decoding process of current GOP, a decoding unit used in the decoding process of the previous GOP, when a B picture in the current GOP includes information related to an I picture and a P picture of the previous GOP.

According to a seventh aspect of the invention, there is provided a moving picture reproducing device which decodes compressed moving picture and provides the decoded image to a display device. The device comprises a luminance decoding unit which decodes luminance component in the compressed moving picture, and a color-difference decoding unit which decodes color-difference component in the compressed moving picture, wherein the luminance decoding unit decodes the compressed moving picture in a resolution which is lower than a resolution used by the color-difference decoding unit.

According to an eighth aspect of the invention, there is provided a method of decoding moving picture comprising the steps of obtaining a display size of image displayed on a display device, selecting a resolution to decode the compressed moving picture from different resolutions, according to the display size obtained by the obtaining step, and decoding the compressed moving picture in the selected resolution.

According to a ninth aspect of the invention, there is provided a method of decoding moving picture comprising the steps of decoding luminance component in the compressed moving picture, and decoding color-difference component in the compressed moving picture. Wherein the step of decoding luminance component decodes the compressed moving picture in a resolution which is lower than a resolution used by the step of decoding color-difference component.

According to a tenth aspect of the invention, there is provided a computer data signal embodied in a carrier wave and representing a sequence of instructions which, when executed by a processor, cause the processor to perform a method of decoding moving picture. The method comprises the steps of obtaining a display size of image displayed on a display device, selecting a resolution to decode the compressed moving picture from different resolutions, according to the display size obtained by the obtaining step, and decoding the compressed moving picture in the selected resolution.

According to an eleventh aspect of the invention, there is provided a computer data signal embodied in a carrier wave and representing a sequence of instructions which, when executed by a processor, cause the processor to perform a method of decoding moving picture. The method comprises the steps of decoding luminance component in the compressed moving picture, and decoding color-difference component in the compressed moving picture, wherein the step of decoding luminance components decodes the compressed moving picture in a resolution which is lower than a resolution used by the step of decoding color-difference component.

DESCRIPTION OF THE PREFERRED EMBODIMENT

First Embodiment

Figure 1:
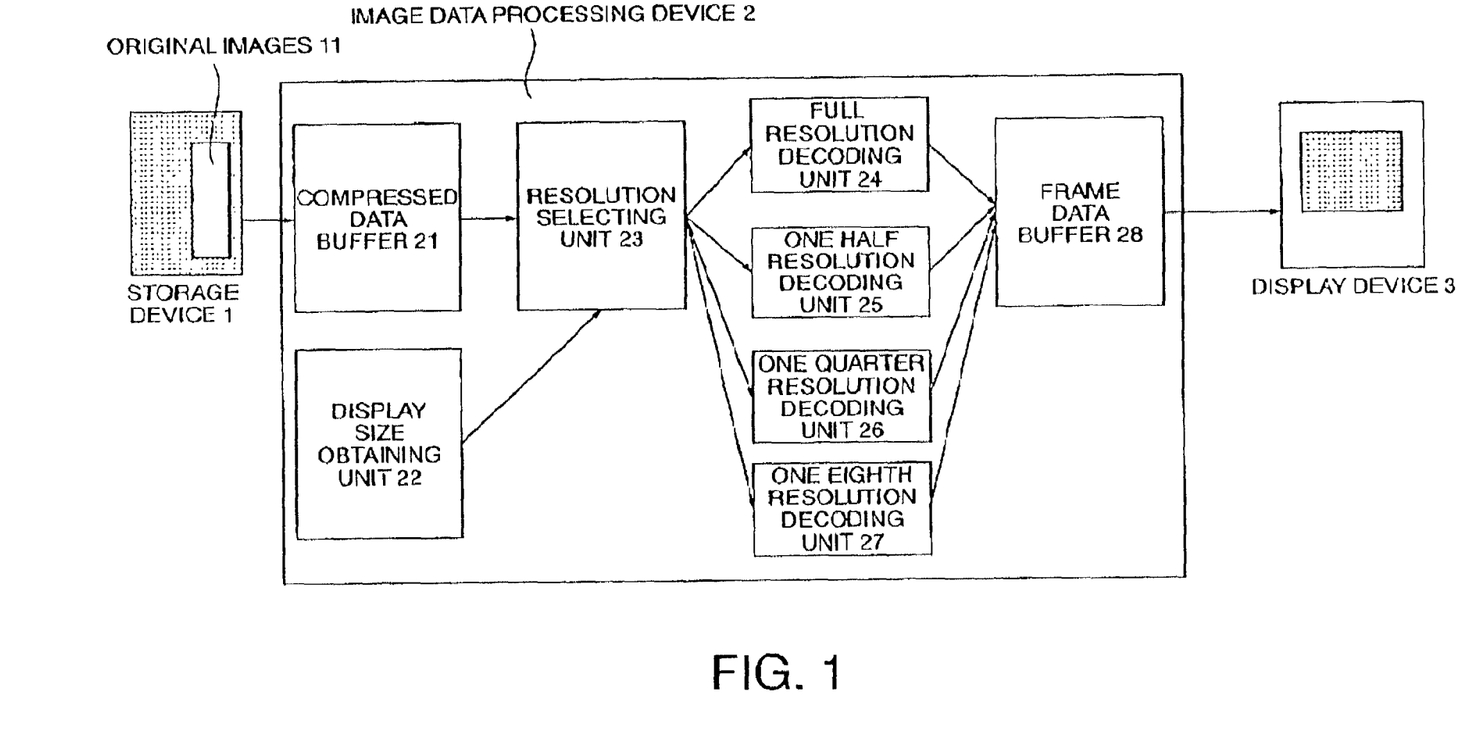
FIG. 1 shows a diagram of a moving picture reproducing device according to a first embodiment of the invention.

As shown in FIG. 1, a moving picture reproducing device according to a first embodiment of the invention includes a storage device 1 which stores a moving picture compressed in accordance with a compression method as original images 11. In addition, the illustrated device has an image data processing device 2 which performs decoding process on the original images 11 stored in the storage device 1, and a display device 3 on which the decoded moving picture is displayed.

The image data processing device 2 includes a compressed data buffer 21, a display size obtaining unit 22, a resolution selecting unit 23, a full resolution decoding unit 24, a one half resolution decoding unit 25, a one quarter resolution decoding unit 26, a one eighth resolution decoding unit 27, and a frame data buffer 28.

The compressed data buffer 21 temporarily stores the original images 11 which are loaded from the storage device 1, and the display size obtaining unit 22 obtains a display size of a display window on the display device 3. Further, the resolution selecting unit 23 selects a decoding resolution based on the display size which is obtained by the display size obtaining unit 22.

The full resolution decoding unit 24 decodes all data of the original images 11, that is, decodes the images 11 in a full resolution. The one half resolution decoding unit 25 performs decoding process of the original images 11 in a half resolution in both a vertical and a horizontal direction. The one quarter resolution decoding unit 26 performs the decoding process of the original images 11 in one quarter resolution in both a vertical and a horizontal direction. The one eighth resolution decoding unit 27 performs the decoding process of the original images 11 in one eighth resolution in both a vertical and a horizontal direction. The frame data buffer 28 temporarily stores the decoded images to be displayed.

The resolution selecting unit 23 selects a full resolution and instructs the full resolution decoding unit 24 to decode the original images 11, when the display size obtained by the display size obtaining unit 22 is larger than the size of the original images 11. Alternatively, the resolution selecting unit 23 selects one half resolution and instructs the one half resolution decoding unit 25 to decode the original images 11, when the display size obtained by the display size obtaining unit 22 is smaller than the size of the original images 11 and is larger than half of the size of the original images 11.

For example, the display size obtaining unit 22 obtains the display size from an area storing system information or an area related to a moving picture reproducing application. Both the areas are allocated in the PC. An operating system can write the display size of the moving picture reproducing application in the area storing system information. Also, the moving picture reproducing application can write the display size of its own in the related area. When the display size is changed by, for example, a user, the display size written in the area storing system information or the area related to the application also is updated.

Also, the resolution selecting unit 23 selects one quarter resolution and instructs the one quarter resolution decoding unit 26 to decode the original images 11, when the display size obtained by the display size obtaining unit 22 is smaller than the half of the size of the original images 11 and is larger than one quarter of the size of the original images 11. Further, the resolution selecting unit 23 selects one eighth resolution and instructs the one eighth resolution decoding unit 27 to decode the original images 11, when the display size obtained by the display size obtaining unit 22 is smaller than the one quarter of the size of the original images 11.

Herein, the display size and the size of the original images 11 are compared in both the vertical and the horizontal direction. Therefore, for example, when the display size is smaller than the size of the original images 11 "in both the vertical direction and the horizontal direction", it is determined that the display size is "smaller" than the size of the original images 11.

On the contrary, when the display size is larger than the size of the original images 11 "in both the vertical direction and the horizontal direction", it is determined that the display size is "larger" than the size of the original images 11.

The decoding process in lower resolution can be realized by reducing an order of IDCT (Inverse Discrete Cosine Transformation). Also, motion compensation is performed in a size corresponding to the order of the IDCT. Specifically, the full resolution decoding unit 24 performs eight by eight (pixels) IDCT while the one half resolution decoding unit 25 performs four by four (pixels) IDCT. In addition, motion compensation is also executed in the half resolution decoding unit 25 by reducing a macro block size to a half in a vertical and a horizontal direction.

Also, the one quarter resolution decoding unit 26 performs two by two (pixels) IDCT and motion compensation with reducing the macro block size to one quarter in a vertical and a horizontal direction. Further, the one eighth resolution decoding unit 27 performs one by one IDCT, that is, performs IDCT only for DC component and motion compensation with reducing the macro block size to one eighth in a vertical and a horizontal direction.

Figure 2:
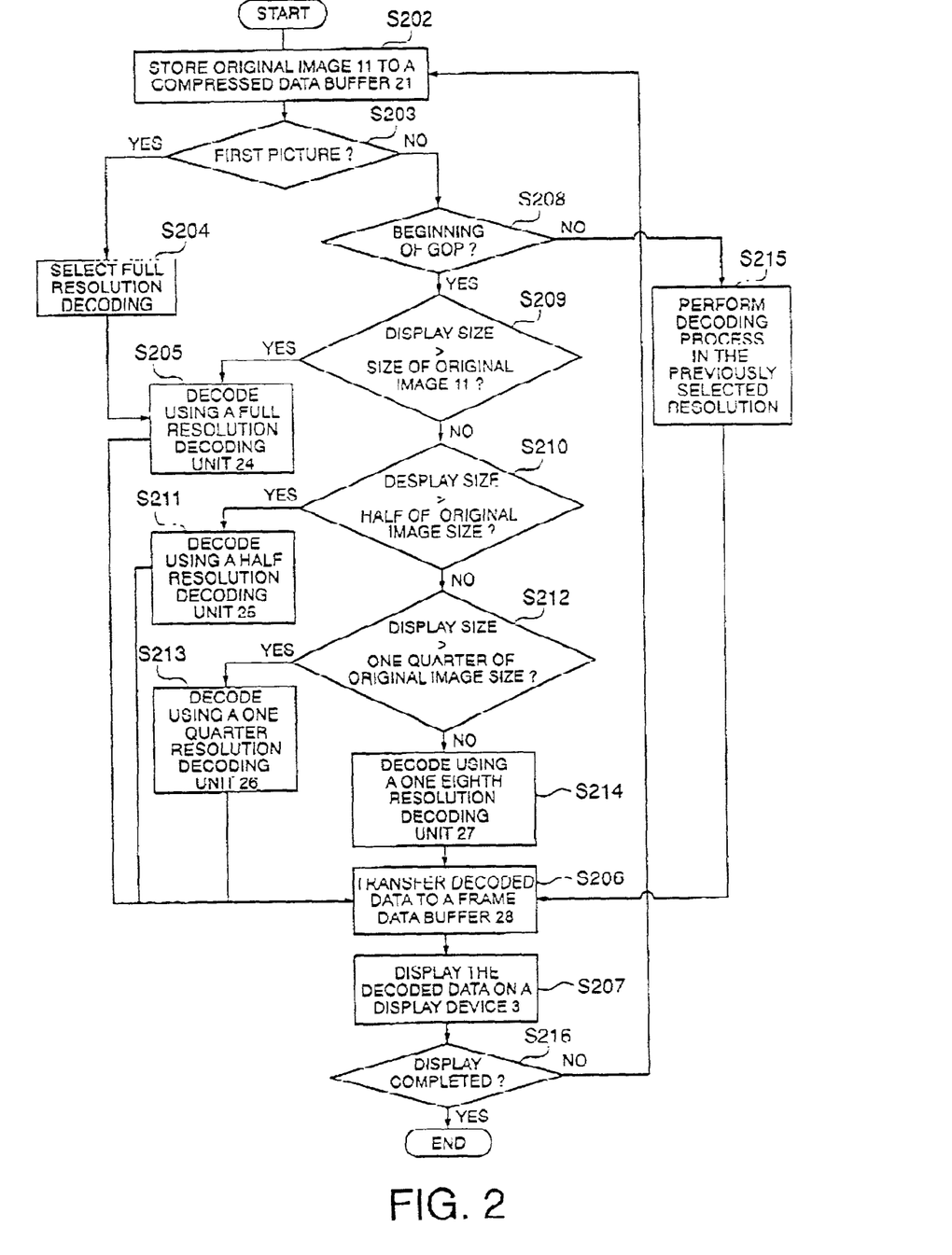
FIG. 2 shows a flowchart describing operation of the moving picture reproducing device shown in FIG. 1.

Next, description is made about operation of decoding process of the original images 11 at the moving picture reproducing device according to the first embodiment of the invention, with reference to FIG. 2.

Herein, it is assumed that the original images 11 stored in the storage device 1 are compressed based on MPEG.

At first, the original images 11 are loaded from the storage device 1 into the image data processing device 2, and then the original images 11 are transferred to the compressed data buffer 21 (step S202).

Next, the resolution selecting unit 23 determines whether the first picture of the original images 11 is processed or not (S203). When the first picture is processed, the resolution selecting unit 23 selects the full resolution decoding unit 24 to process the first picture of the original images 11 (S204). Then, the full resolution decoding unit 24 performs decoding process on the first picture in a full resolution (S205) and transfers decoded first picture, that is, data to be displayed to the frame data buffer 28 (S206). The decoded first picture is then displayed on the display device 3 (S207).

When a received picture is not the first picture, the resolution selecting unit 23 determines whether the picture is at the beginning of GOP (Group of Pictures) or not (S208). When the picture is at the beginning of GOP, the display size obtaining unit 22 instructs to obtain the display size of a display window displayed on the display device 3.

The resolution selecting unit 23 determines whether the display size obtained by the display size obtaining unit 22 is larger than the size of the received picture or not (S209). When the display size is larger than the size of the received picture, the resolution selecting unit 23 selects the full resolution decoding unit 24 to decode the picture. Then the full resolution decoding unit 24 decodes the picture in a full resolution (S205), and transfers the decoded picture, that is, data to be displayed to the frame data buffer 28 (S206). After that, the decoded picture is displayed on the display device 3 (S207).

When the obtained display size is not larger than the size of the received picture, the resolution selecting unit 23 determines whether the display size is larger than a half size of the received picture in both a vertical direction and a horizontal direction (S210). When the display size is larger than the half size of the received picture, the resolution selecting unit 23 selects the one half resolution decoding unit 25 to decode the received picture. Then, the one half resolution decoding unit 25 decodes the picture in a half resolution in both a vertical and a horizontal direction (S211), and transfers the decoded picture, that is, data to be displayed to the frame data buffer 28 (S206). After that, the decoded picture is displayed on the display device 3 (S207).

When the obtained display size is not larger than the half size of the received picture in both a vertical and a horizontal direction, the resolution selecting unit 23 determines whether the display size is larger than one quarter of the size of the received picture in both a vertical direction and a horizontal direction (S212). When the display size is larger than the one quarter of the size of the received picture, the resolution selecting unit 23 selects the one quarter resolution decoding unit 26 to decode the received picture, Then, the one quarter resolution decoding unit 26 decodes the picture in one quarter resolution in both a vertical and a horizontal direction (S213), and transfers the decoded picture, that is, data to be displayed to the frame data buffer 28 (S206). After that, the decoded picture is displayed on the display device 3 (S207).

When the obtained display size is not larger than the one quarter size of the received picture in both a vertical and a horizontal direction, the resolution selecting unit 23 selects the one eighth resolution decoding unit 27 to decode the received picture. Then, the one eighth resolution decoding unit 27 decodes the picture in one eighth resolution in both a vertical and a horizontal direction (S214), and transfers the decoded picture, that is, data to be displayed to the frame data buffer 28 (S206). After that, the decoded picture is displayed on the display device 3 (S207).

When a picture which is not at the beginning of GOP is received, the resolution selecting unit 23 selects one of the processing units (24–27) which decodes the received picture in the same resolution as the previous picture (S215). For example, when the previous picture is decoded by the one half resolution decoding unit 25, the current picture which is not the beginning of GOP is to be decoded by the one half resolution decoding unit 25.

The decoded picture is transferred to the frame data buffer 28 (S206). Thereafter, the decoded picture is displayed on the display device 3 (S207).

The resolution selecting unit 23 determines whether moving pictures to be displayed remain or not (S216). When the images still remain, process returns to step S202 and the next picture is processed. On the other hand, all the images are processed, process is ended (S217).

In the moving picture reproducing device according to the first embodiment, at the beginning of decoding process of the original images 11, that is, on starting reproduction, decoding process is performed in a full resolution. But, a resolution may be determined based on a display size which is stored when the previous reproducing process of a series of moving pictures is completed.

Also, in the first embodiment, when a picture which resides at the beginning of GOP is received, a display size is obtained by the display size obtaining unit 22, since motion compensation of decoding process cannot be performed successfully if a resolution of a picture is not changed at the beginning of GOP. But, it is desirable to perform decoding process in a resolution corresponding to the previous GOP when a B picture which resides at the beginning of GOP includes information related to an I picture and P picture of the previous GOP.

As described above, in the first embodiment, speed of decoding process of images is improved by performing decoding process in a resolution according to a display size of the images. That is, decoding process is effectively neglected in a part of which a user is unaware. Therefore, the decoding process is simplified without degradation of image quality and reproduction performance is increased. Further, a reduced image can be generated regardless of performance of graphic hardware.

Second Embodiment

Figure 3:
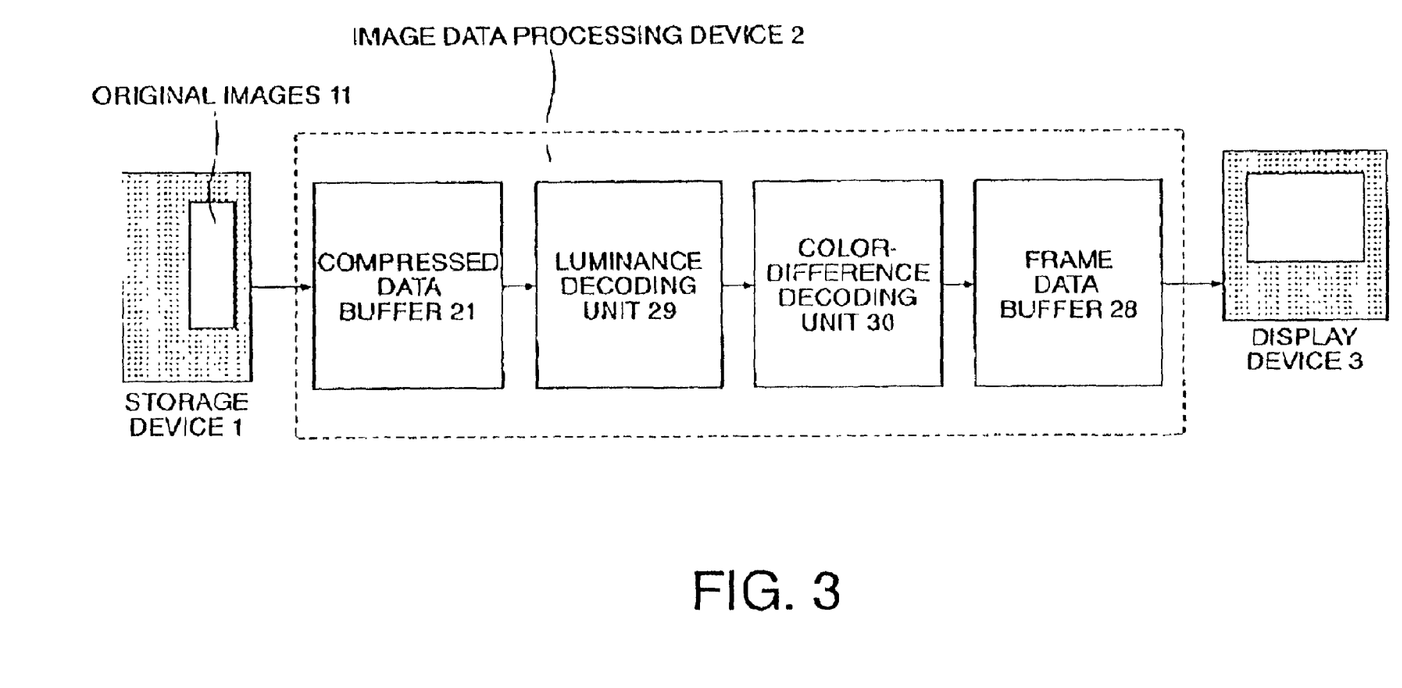
FIG. 3 shows a diagram of a moving picture reproducing device according to a second embodiment of the invention.

As shown in FIG. 3, a moving picture reproducing device according to a second embodiment of the invention includes, like in the first embodiment, a storage device which stores original images 11, an image data processing device 2 which is controlled by a program and decodes the original images 11, and a display device 3 on which the decoded images are displayed. Also, constructive elements shown in FIG. 3 each of which is the same as the corresponding element shown in FIG. 1 have the same numeric symbols as the corresponding elements shown in FIG. 1.

In the second embodiment, the image data processing device 2 includes a compressed data buffer 21 which stores the original images 11 loaded from the storage device 1, a luminance decoding unit 29 which decodes luminance component in a half resolution in a vertical direction, a color-difference decoding unit 30 which decodes color-difference component in a full resolution, and a frame buffer 28 which temporarily stores a moving picture to be displayed.

Figure 4:
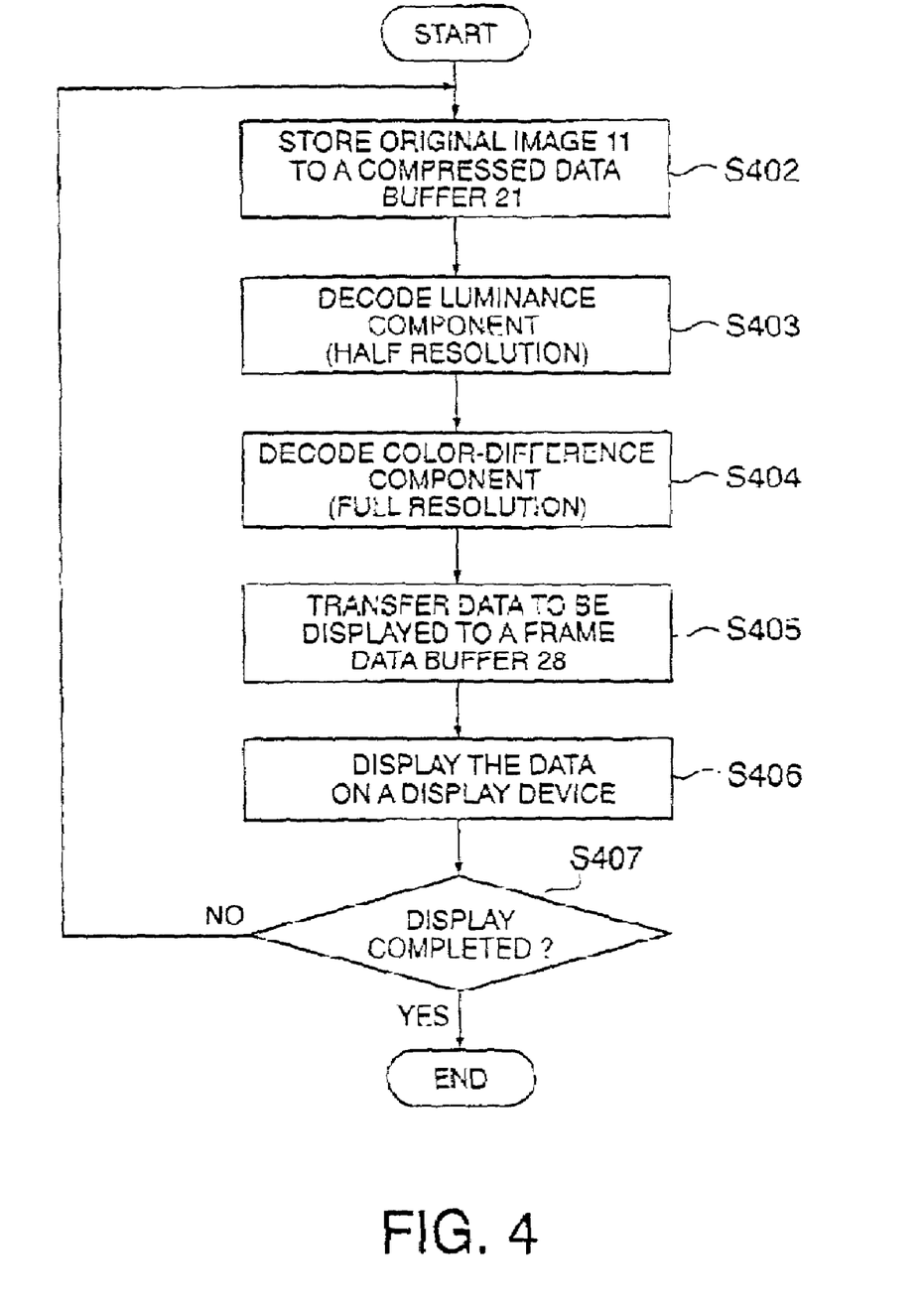
FIG. 4 shows a flowchart describing operation of the moving picture reproducing device shown in FIG. 3.

Next, description is made about operation of the second embodiment with reference to FIG. 4.

At first, the original images 11 are loaded from the storage device 1 into the image data processing device 2, and then the original images 11 are transferred to the compressed data buffer 21 (S402).

The luminance decoding unit 29 decodes, in a half resolution in a vertical direction, luminance component in the original images 11 stored in the compressed data buffer 21 (S403). And the color-difference decoding unit 30 decodes, in a full resolution, chrominance or color-difference component in the original images 11 (S404). The decoded images are then transferred to the frame data buffer 28 (S205). After that, the decoded images are displayed on the display device 3 (S406).

The luminance decoding unit 29 and the color-difference decoding unit 30 determines whether the original images 11 to be displayed remain or not (S407). When images to be displayed are left, process returns to step S402 and the next picture is decoded. Otherwise, process is completed (S408).

When MPEG data are decoded, luminance component Y and color-difference components U and V are obtained. Considering that human being is more sensitive to the luminance component than the color-difference component, data amount of Y is preferably equal to four times of data amount of U or V. That is, a ratio of the data amount of the three components can be represented as Y:U:V=4:1:1.

But, in general, when image data are displayed on a display device, the image data are displayed in a ratio Y:U:V=4:2:2. Therefore, color-difference information are expanded twice in a vertical direction on displaying the image data.

Thus, when image data are displayed in a lower resolution, the luminance component is decoded at half resolution and the color-difference is decoded at its original resolution the ratio of Y:U:V becomes equal to 4:2:2. As a result, information content about the color-difference components are relatively increased, and image data are displayed with being full of color even if the image data are reduced.

Also, the second embodiment is effectively operable in progressive scanning, but in interlace scanning, it cannot be operable well since a frame used in interlace scanning includes lines each of which belongs to an image at a time point or another image at another time point.

As described above, according to the second embodiment, decoding process is performed in a lower resolution about luminance component, and in an original resolution about color-difference components. Thereby, information content about the color-difference components are relatively increased, colorful image data can be displayed.

Also, a scope of the invention is not limited to the above mentioned embodiments and it is clear that a person skilled in the art can modify and amend the embodiments within the spirit and the scope of the invention. Further, it is possible to construct a desirable moving picture reproducing device according to the invention independently of the number, locations, and shapes of the above mentioned constructive elements.

What is claimed is:

1. A moving picture reproducing device which decodes compressed moving picture into decoded image displayed on a display device, comprising:
   a plurality of decoding units each of which decodes the compressed moving picture in a resolution which is different from resolutions of the other decoding units;
   a display size obtaining unit which obtains a display size of image displayed on the display device; and
   a decoding unit selecting unit which selects a decoding unit to decode the compressed moving picture, from the plurality of decoding units according to the display size obtained by the display size obtaining unit,
   wherein the decoding unit selecting unit newly selects the decoding unit whenever the selected decoding unit decodes a predetermined amount of the compressed moving pictures,
   wherein the moving picture is compressed based on MPEG and the decoding unit selecting unit selects the decoding unit for each GOP (Group of Picture), and
   wherein the decoding unit selecting unit selects, at the beginning of decoding process of current GOP, a decoding unit used in the decoding process of the previous GOP, when a B picture in the current GOP includes information related to an I picture and a P picture of the previous GOP.

2. The moving picture reproducing device of claim 1, wherein when the selected decoding unit decodes the compressed moving picture in a resolution which is lower than an original resolution of the compressed moving picture, the decoding unit decodes them by reducing an order of IDOT (Inverse Discrete Cosine Transformation) and performing motion compensation according to the reduced order of IDCT.

3. The moving picture reproducing device of claim 1 further including a display size storing device which stores the display size used when the previous decoding process is completed, wherein the decoding unit selecting unit selects, at the beginning of current decoding process, one of the decoding units according to the display size stored in the display size storing device.

4. A method of decoding moving picture comprising the steps of:
   obtaining a display size of an image displayed on a display device;
   selecting a resolution to decode the compressed moving picture from different resolutions, according to the display size obtained by the obtaining step; and
   decoding the compressed moving picture in the selected resolution,
   wherein the selecting step newly selects the resolution whenever a predetermined amount of the compressed moving pictures are decoded by the decoding step,
   wherein the moving picture is compressed based on MPEG and the selecting step selects the resolution for each GOP (Group of Picture), and
   wherein the selecting step selects, at the beginning of decoding process of current GOP, a resolution used in the decoding process of the previous GOP, when a B picture in the current GOP includes information related to an I picture and a P picture of the previous GOP.

5. The method of claim 4, wherein when the decoding step decodes the compressed moving picture in a resolution which is lower than an original resolution of the compressed moving picture, the decoding step decodes them by reducing an order of IDCT (Inverse Discrete Cosine Transformation) and performing motion compensation according to the reduced order of IDCT.

6. The method of claim 4, further comprising a step of storing the display size used when the previous decoding process is completed, wherein the selecting step selects, at the beginning of current decoding process, one of the different resolutions according to the stored display size.

* * * * *